United States Patent
Rogelja

(10) Patent No.: US 10,173,081 B2
(45) Date of Patent: Jan. 8, 2019

(54) DESCENDER

(71) Applicant: Boris Rogelja, Hurtsvillle Grove (AU)

(72) Inventor: Boris Rogelja, Hurtsville Grove (AU)

( * ) Notice: Subject to any disclaimer, the term of this patent is extended or adjusted under 35 U.S.C. 154(b) by 0 days.

(21) Appl. No.: 15/550,962

(22) PCT Filed: Feb. 12, 2016

(86) PCT No.: PCT/AU2016/050090
§ 371 (c)(1),
(2) Date: Aug. 14, 2017

(87) PCT Pub. No.: WO2016/131092
PCT Pub. Date: Aug. 25, 2016

(65) Prior Publication Data
US 2018/0021602 A1    Jan. 25, 2018

(30) Foreign Application Priority Data

Feb. 17, 2015    (AU) .................................. 2015900527

(51) Int. Cl.
*A62B 1/14*    (2006.01)
*A63B 29/02*    (2006.01)
*F16D 63/00*    (2006.01)

(52) U.S. Cl.
CPC ................ *A62B 1/14* (2013.01); *A63B 29/02* (2013.01); *F16D 63/008* (2013.01)

(58) Field of Classification Search
CPC .................................. A62B 1/14; A63B 29/02
See application file for complete search history.

(56) References Cited

U.S. PATENT DOCUMENTS 5,054,577 A    10/1991    Petzl et al.
5,360,083 A    11/1994    Hede
(Continued)

FOREIGN PATENT DOCUMENTS

EP    2630991 A2 *    8/2013    ............... A62B 1/14
FR    2904564 A1 *    2/2008    ............... A62B 1/14
WO    2003092816 A1    11/2003

OTHER PUBLICATIONS

International Patent Application No. PCTAU2016/050090, International Search Report and Written Opinion, dated Mar. 8, 2016, 7 pages.

*Primary Examiner* — Alvin C Chin-Shue
(74) *Attorney, Agent, or Firm* — Kilpatrick Townsend & Stockton LLP; Dean W. Russell

(57) ABSTRACT

A descender (10) comprises a rear or base plate (20), a front plate (22) which is fixedly mounted to the base plate, generally parallel to and spaced from the base plate and an arm (30) which is pivotally mounted to the base plate and/or the front plate for movement between the two plates. The arm (30) defines a generally curved channel (38) through which a rope (14) may pass. The channel is defined between a sheave (34) and a wall (37) of the arm and defines an entrance (38*a*) and an exit (38*b*) for the rope. The sheave (34) is pivotable about an axis, the sheave being lightly biased towards a first or rest position. Pivoting of the sheave about the axis in a first direction, away from the rest position, causes an increase in the friction applied to the rope passing through the channel, typically by causing the exit of the channel to narrow. A handle (46) is provided, operation of which may cause the sheave (34) to rotate towards its rest or neutral position thereby allowing faster passage of the rope through the descender. The descender (10) includes means for connecting the descender to a harness or the like.

13 Claims, 13 Drawing Sheets

(56) References Cited

U.S. PATENT DOCUMENTS

| | | | | |
|---|---|---|---|---|
| 5,577,576 | A * | 11/1996 | Petzl | A62B 1/14 182/193 |
| 2002/0017428 | A1* | 2/2002 | Mauthner | A62B 1/10 182/5 |
| 2006/0207829 | A1* | 9/2006 | Mauthner | A62B 1/14 182/5 |
| 2009/0026023 | A1* | 1/2009 | Petzl | A62B 1/14 188/65.4 |
| 2014/0196984 | A1* | 7/2014 | Chabod | A62B 1/14 182/18 |
| 2014/0262611 | A1* | 9/2014 | Oddou | A62B 1/14 182/5 |
| 2017/0189725 | A1* | 7/2017 | Malcolm | A62B 1/14 |

* cited by examiner

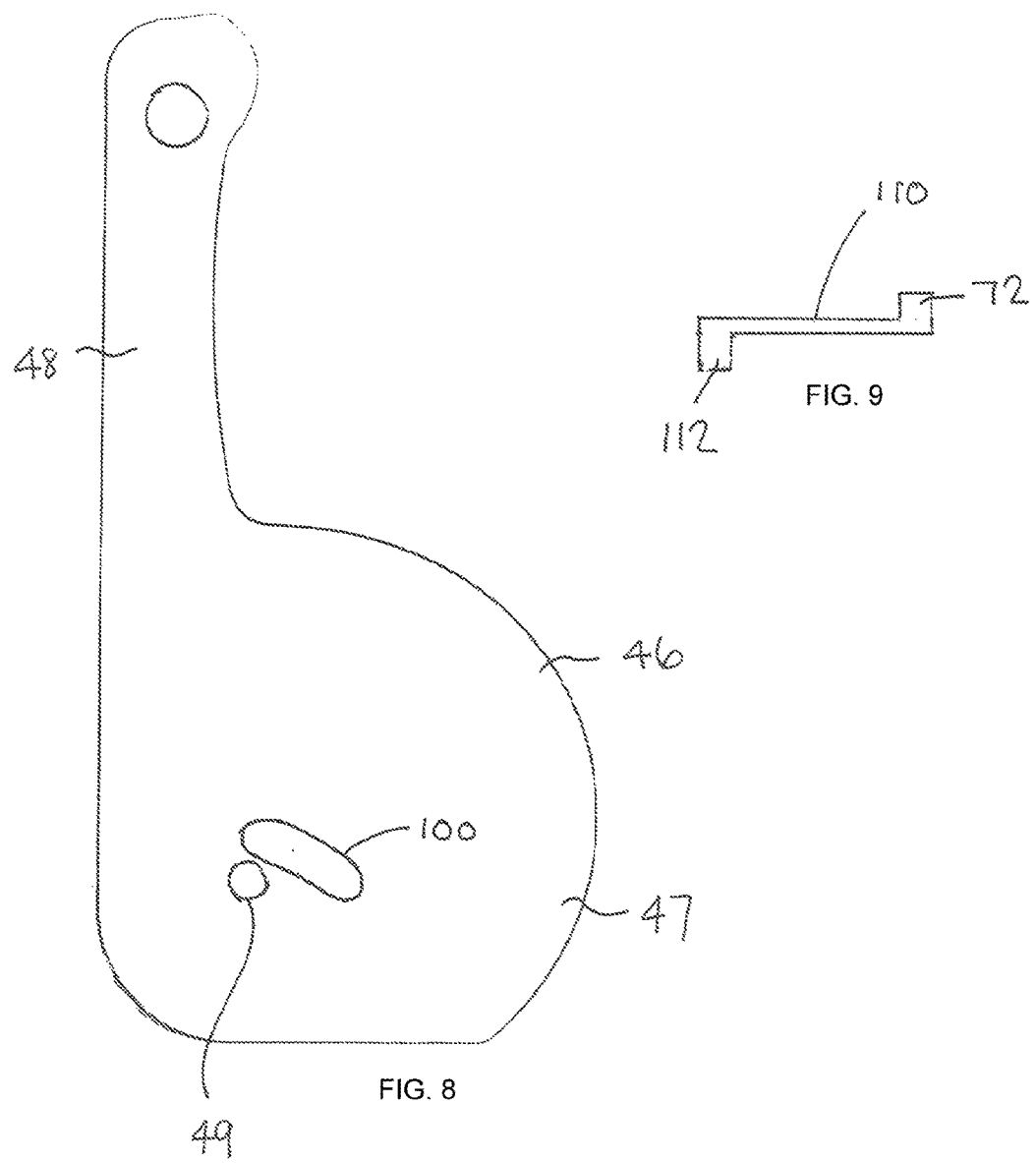

DESCENDER

CROSS-REFERENCE TO RELATED APPLICATIONS

This is a U.S. national phase under 35 U.S.C. 371 of International Patent Application No. PCT/AU2016/050090, titled "Improved Descender" and filed Feb. 12, 2016, which claims priority from Australian Provisional Patent Application No 2015900527 filed on Feb. 17, 2015, the content of each which is incorporated herein by reference.

TECHNICAL FIELD

The present application relates to a descender for use in abseiling and belaying and the like.

BACKGROUND

Abseiling is a technique which is used to descend steep surfaces such as cliff faces and is often used by persons involved in activities such as mountain climbing, canyoning and caving. In order to abseil down a cliff face, one end of a rope is made fast at the top of the cliff and the person making the descent then slides down the rope. The rope is passed either around the body of the person or, more usually, through a descender attached to a harness worn by the person such that the passage of the rope around the body or through the descender provides sufficient friction to slow the rate of descent to a safe speed. These techniques are also used in the workplace e.g. by persons working at heights on roofs and buildings, and by rescue services.

A descender defines rope engaging services around and between which the rope travels along a tortuous path, to provide frictional engagement between the rope and the descender. The rate of descent is normally controlled by holding the free or tail end of the rope to control the tension on the rope where it emerges from the descender thereby to control the degree of friction engagement between the rope and descender, which in turn controls the rate of descent.

Descenders used in abseiling vary greatly in performance and complexity, there being a variety of relatively simple devices which rely on frictional engagement between the rope and metal rings or racks about which the rope is wrapped, and a number of more complex descenders which incorporate a braking mechanism which allows friction between the rope and descender to be varied other than by simply controlling the free or tail end of the rope. The earliest of these more complex devices have a handle or lever which, when operated, tended to increase the friction between the descender and the rope. This type of descender had the problem that the brake was not self-engaging and therefore, if the user was knocked unconscious, he or she would fall in the same way as a user of the earlier devices.

A number of devices now include automatic braking mechanisms in which a handle is operated by a person using descender to control their speed of descent and if the handle is released, a brake actuates and prevents a user falling uncontrollably. Such a descender is disclosed in U.S. Pat. No. 4,596,314.

It is known to provide a descender having a sheave around which a rope passes located between front and rear plates which pivot to open the descender to allow a rope to be threaded through. The sheave may be shaped and pivotable to control the resistance to the passage of the rope. One disadvantage to such descenders is that if the plates pivot open during use, the possibility exists that the descender could fall off the rope, if the plates are not locked in a closed position.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY

According to the present invention there is provided a descender comprising:

a rear or base plate;

a front plate which is fixedly mounted to the base plate, generally parallel to and spaced from the base plate;

an arm which is pivotally mounted to the base plate and/or the front plate, wherein the arm defines a generally curved channel through which a rope may pass, the channel being defined between a sheave and a wall of the arm and defining an entrance and an exit for the rope, wherein the sheave is pivotable about an axis, the shave being, typically lightly, biased towards a first or rest position, and wherein pivoting of the sheave about the axis in a first direction, away from the rest position, causes an increase in the friction applied to the rope passing through the channel, typically by causing the exit of the channel to narrow; and wherein a handle is provided, operation of which may cause the sheave to rotate towards its rest or neutral position thereby allowing faster passage of the rope through the descender; and wherein the descender includes means for connecting the descender to a harness or the like.

In use, when a rope passes through the descender under tension the friction caused by the rope passing through the descender causes the sheave to move away from the rest position, thus increasing the braking on the rope. Operation of the handle to pivot the shave back towards its rest position reduces the braking force on the rope, thus it is possible to control the rate of descent. The use of fixed front and rear plates and a pivoting arm which can be pivoted out from between the plates for loading rope into the descender makes the descender inherently safer than existing descenders where the front or rear plates pivot to load rope into the descender.

In a preferred embodiment, a post/projection is mounted on the rear plate adjacent the exit to the channel.

The post provided at the exit of the descender provides an additional element that can be used to further increase resistance and slow the movement of the rope through the descender.

Typically, the means for connecting the descender to a harness or the like will be a through hole for receiving a karabiner.

In one embodiment, the handle is able to pivot through a predetermined angle from one end position to a second end position and wherein in the end positions the sheave is either unaffected by the handle or turned towards a position where the rope is subject to increased friction and wherein movement of the handle to a position intermediate the end positions causes the sheave to move towards its rest position.

Thus the operation of the handle is fail safe in the sense that at either extreme position, maximum friction is preferably applied to the rope so the fall of a user who falls unconscious and releases the handle will be braked while a user who might panic and push the lever too far would also have their fall braked.

The sheave may define a bulge or projection which when the sheave is rotated under load, restricts the exit of the channel.

The sheave may define an integral projection on its underside which passes through a typically arcuate slot in the base plate of the arm. The projection may engage in use with a projection associated with and moveable by operation of the handle, by means of which the handle is able to rotate the sheave.

BRIEF DESCRIPTION OF DRAWINGS

A specific embodiment of the present invention will now be described, by way of example only, and with reference to the accompanying drawings in which:

FIG. 8 is a schematic drawing of a handle of the descender;

FIG. 9 is a schematic drawing of a connecting rod of the descender;

DESCRIPTION OF EMBODIMENTS

Figure 1:
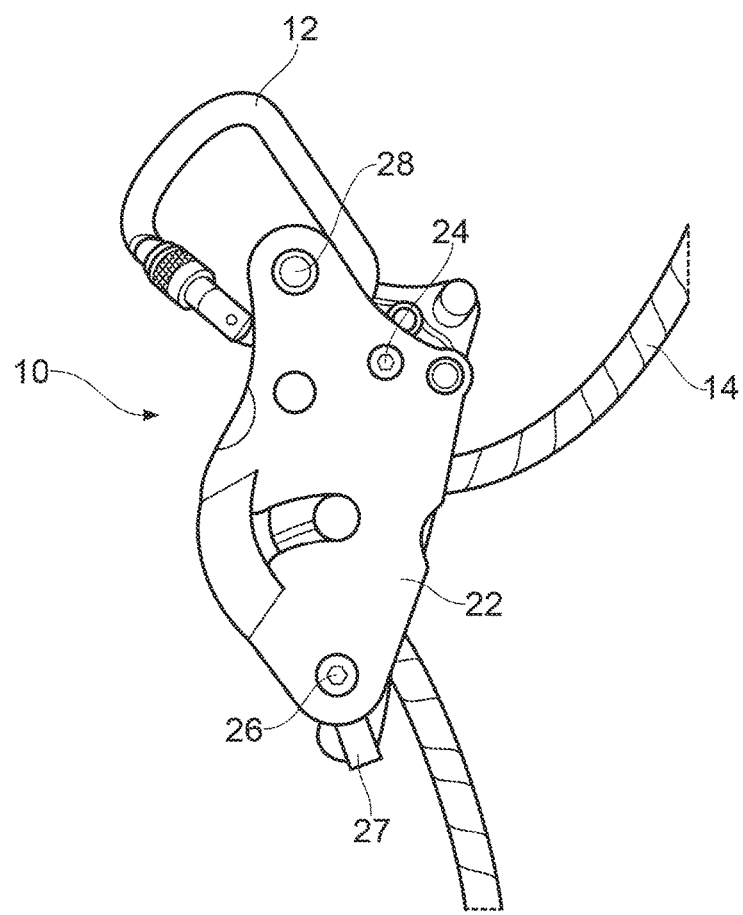
FIG. 1 is a front photographic view of a descender embodying the present invention, showing a rope passing through the descender, with the descender closed.

Referring to the drawings, FIG. 1 shows a descender 10, to which a karabiner 12 is attached, and through which a rope 14 passes.

The descender includes a rear plate 20 (refer to FIG. 2) and a front plate 22. The front plate is mounted in a fixed arrangement relative to the rear plate on three fixed posts 24, 26 and 28. The posts maintain the front plate parallel to, and a fixed distance from, the rear plate. A loop 27 is pivotally mounted attached to fixed post 26 and can be used for attaching a karabiner to the descender.

Figure 3:
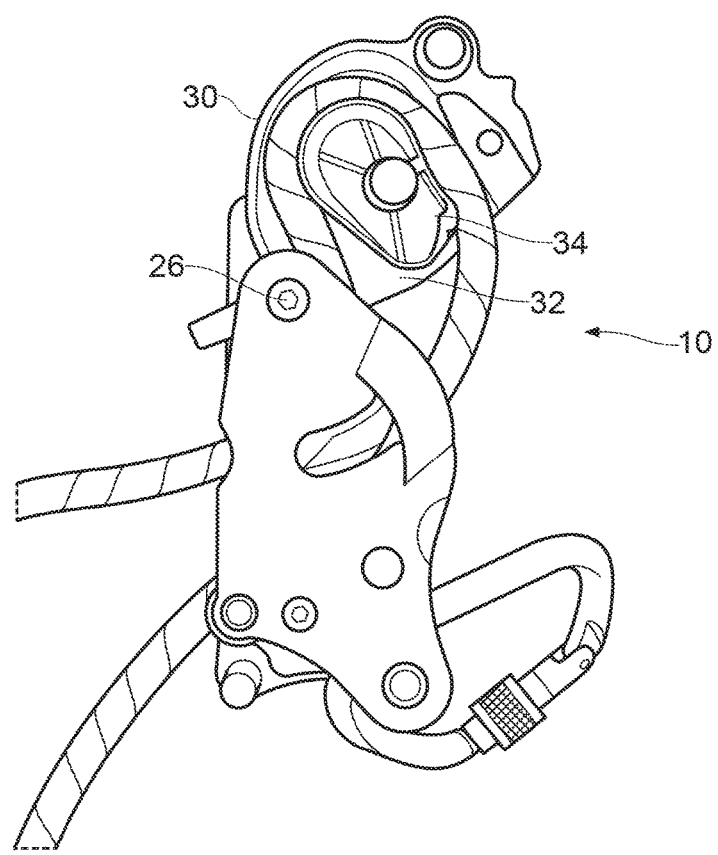
FIG. 3 is a front photographic view of the descender of Figure, showing the descender open.
Figure 5:
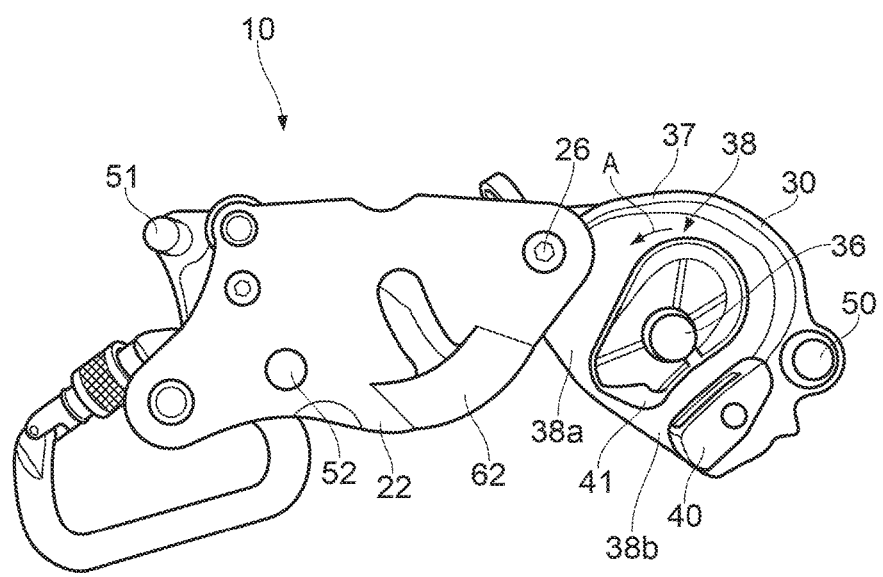
FIG. 5 is a front view of the descender of Figure, showing the descender open and without the rope.

With reference to FIGS. 3 and 5 in particular, an arm 30 is pivotally mounted about the post 26. The arm 30 defines a base plate 32 on which a shaped sheave 34 is mounted and around which a rope may pass. With reference to FIG. 5, the shaped sheave 34 is pivotally mounted about a pivot 36. A wall 37 extends around the curved perimeter of the arm so as to define a generally U-shaped channel/rope guide 38, having an entrance 38a and an exit 38b, extending around three sides of the sheave through which the rope may pass in use. This assists in retaining the rope in the descender, in use. Also shown is a metal insert 40 which defines a shaped curved channel which guides the passage of the rope out of the rope guide 38. The sheave is biased into the rest position shown in FIG. 5 by a biasing means such as a spring (not shown). The sheave may pivot through up to about 45° in the direction of the arrow A (refer to FIG. 5) which causes a narrowing of the exit channel from the descender. The sheave is generally oval but defines a bulge or salient 41 on that side of the sheave facing and adjacent the exit 38b from the channel 38, and when the sheave pivots in the direction of the arrow A, the bulge 41 moves towards the insert 40 narrowing the channel and slowing the passage of the rope through the descender.

Figure 7:
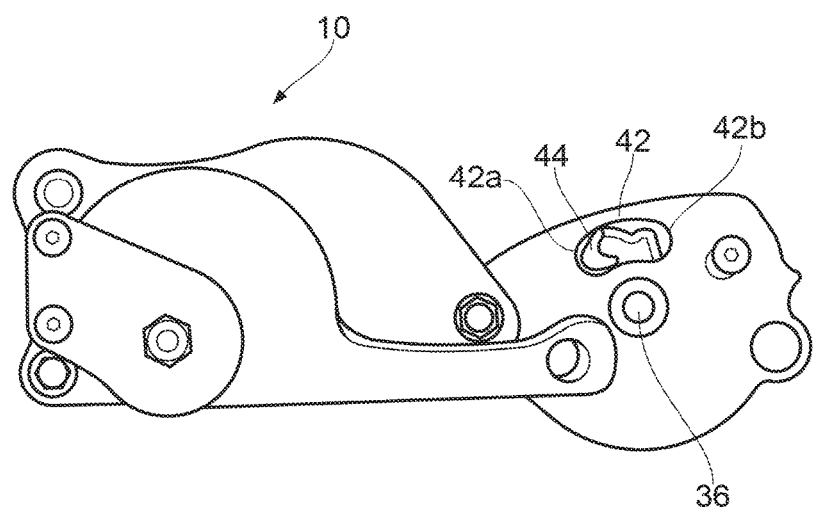
FIG. 7 is a rear view of the descender of Figure, showing the descender open.

As is best seen in FIG. 7, an arcuate slot is 42 defined in the base plate 32 whose arc is centred on the pivot pin 36. A v-shaped projection 44 which is integral with the sheave 34 projects from the underside to the sheave into the slot 42. The slot defines a first end 42a and a second end 42b. The spring associated with the sheave discussed in the paragraph above, biases the projection towards the end 42a of the slot. In use, when the sheave slides on a rope is passing through the channel 38 as is described in more detail below the sheave rotates by friction with the rope which overcomes the light biasing provided by the spring and the v-shaped projection 44 is moved towards and as far the other end of the slot 42b as is described in more detail below. Operation of the handle/lever 46 moves the projection 44 back towards end 42a, in which position minimum braking is applied to the rope.

Figure 2:
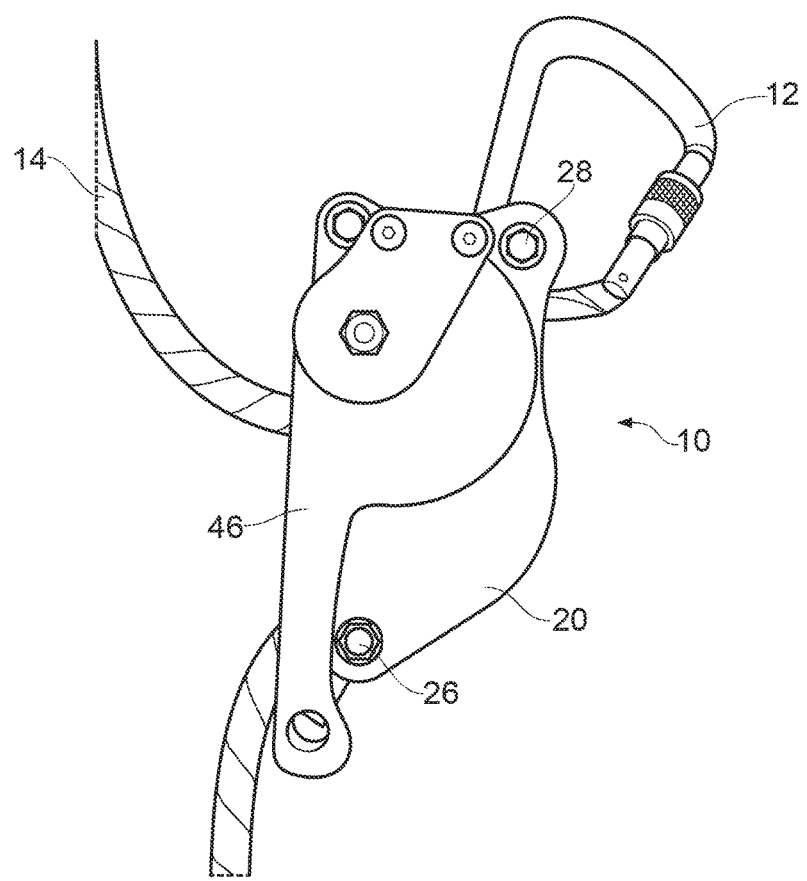
FIG. 2 is a rear photographic view of the descender of FIG. 1.

In use, the arm locates in between the two plates 20 and 22, as shown in FIGS. 1 and 2.

The arm also defines a depressible button/latch 50. As is best seen in FIG. 5, the front plate defines a circular aperture 52. When the arm is rotated about the pivot 26 into position between the plates 20 and 22, the button/latch 50 locates in the aperture and retains the descender closed, until it is manually depressed to overcome the button's bias to release the arm 30.

FIG. 5 also shows an additional post 51 which in use is adjacent the exit of the channel and can be used to increase the twisting in the path along which the rope passes and hence can increase the friction applied to the rope when used.

Figure 4:
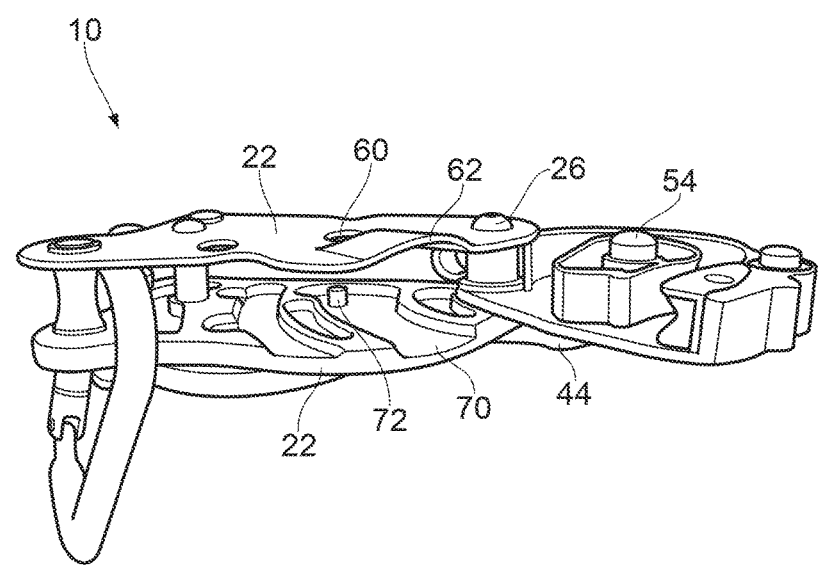
FIG. 4 is a further photographic view of the descender of Figure, showing the descender open

As is best seen in FIG. 4, the centre of the sheave co-axial with the pivot axis of the sheave defines a circular projection 54, which extends above the height of the wall 37. An arcuate guide slot 60 is defined in the plate 22 along which the projection passes as the descender is closed. The entry to the slot 60 is covered by a raised bridging portion 62, which allows the projection to pass under it and helps maintain the strength and integrity of the top plate 22.

Figure 6:
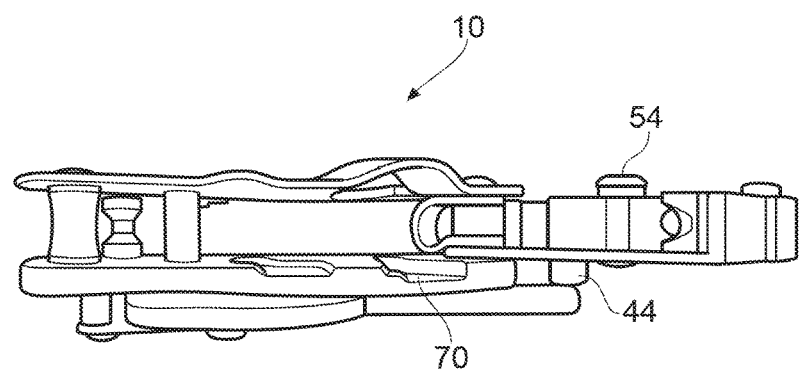
FIG. 6 is a side view of the descender of FIG. 5.

With reference to FIGS. 4 and 6 in particular, it can be seen that there is a wide arcuate channel 70 defined in the surface of the lower plate 20 that faces the arm. The centre of curvature of the channel is the pivot 26. The v-shaped projection 44 passes along that channel 70 when the arm 30 is pivoted between the plates to close the descender. Also visible in the channel is a projection 72 which locates in an arcuate slot in the rear plate of the descender, as is discussed below.

FIG. 8 is a drawing showing the face of the handle 46 which in faces the rear plate 22 of the descender, illustrating detail which is hidden in the assembled descender. It can be seen that the handle has a generally circular portion 47 and an integral arm/lever portion 48. The handle 46 pivots about a circular aperture 49, which is mounted on a circular pin, bolt, or the like 49a, located in the generally circular portion 47. Operation of the lever 48 rotates the handle about pivot 47. FIG. 8 also shows a generally arcuate channel 100, located adjacent the aperture 49.

FIG. 9 shows a connecting rod 110 which is also hidden in the assembled descender. The rod comprises a generally planar member with the cylindrical projection 72 at one end and a cylindrical projection 112 at the other end which is located in the arcuate channel 100 of the handle 46.

Figure 10:
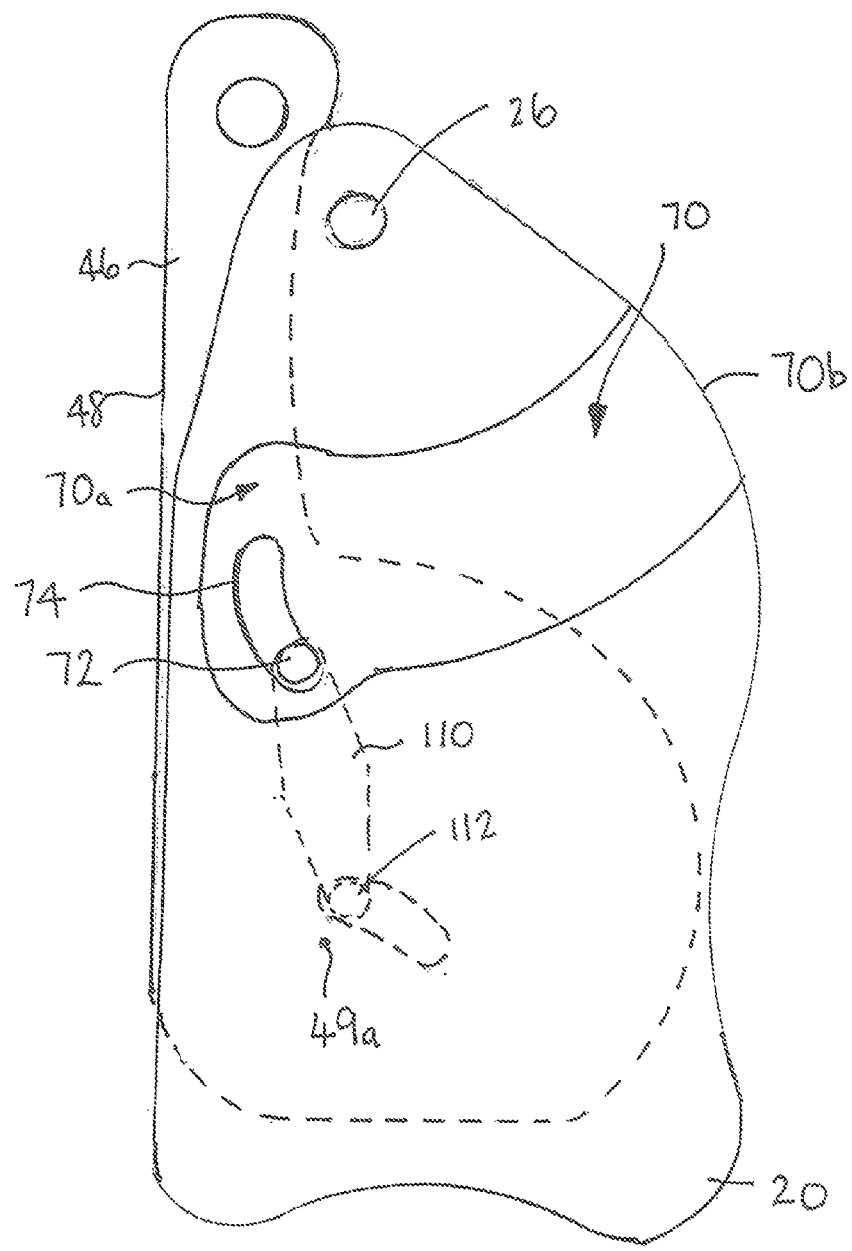
FIG. 10 is a schematic drawing showing a rear plate of the descender and the handle showing hidden detail.

FIG. 10 is a drawing showing just the rear plate of the descender omitting the arm and front plate but showing the outline of the hidden part of the handle 46 behind the plate 20, in dashed lines FIG. 10 shows the channel 70 in detail and that the distal closed end 70a of the channel is enlarged relative to the channel entry 70b. An arcuate/curved through slot 74 is defined adjacent the end 70a, and the cylindrical post or projection 72 extends through that slot into the channel 70.

Figure 11:
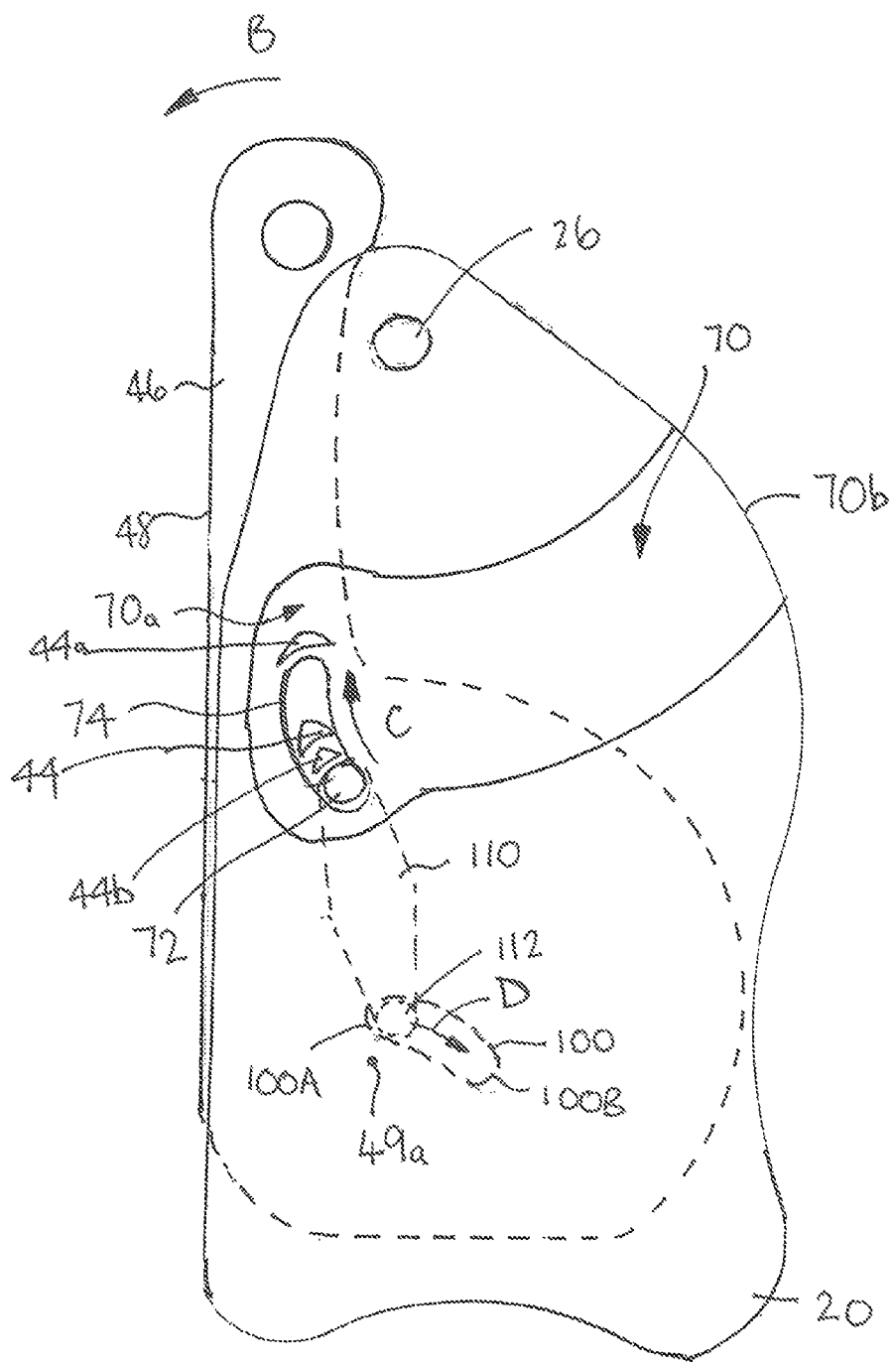
FIG. 11 is a schematic drawing as shown in FIG. 11 but further illustrating the interaction of the sheave with the handle via a connecting rod.
Figure 12:
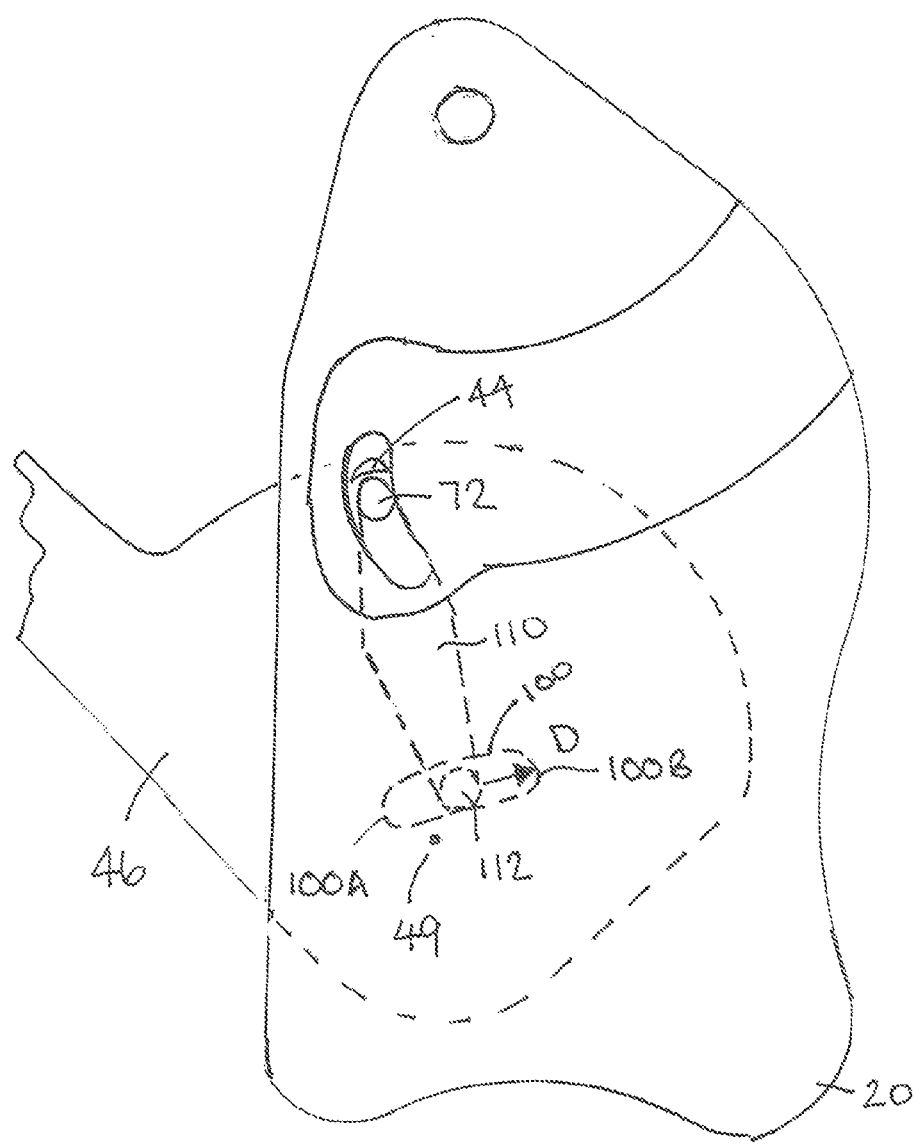
FIG. 12 is a further schematic drawings illustrating the movement of the connecting rod.

FIGS. 11 and 12 illustrate the interaction of the post 72 with the sheave, specifically the projection 44 on the underside of the sheave. FIG. 11 shows the sheave at an intermediate position 44 and end positions 44a and 44b corresponding to end positions 42a and 42b of the channel 42 shown in FIG. 7. It will be appreciated that if the projection 72 travels along the channel in the direction of the arrow B, it will push the projection 44 from the end 44b/42b of the channel to the end 44a/42a, in which position, the least resistance is applied to the rope. It should also be noted that that position corresponds to the resting position of the sheave when it is unloaded due to the biasing spring and the sheave only rotates against the biasing when forces are applied to the sheave due to rope passing through the descender. (Clearly the descender only needs to function when in use and the resting position of the sheave when not in use is irrelevant to the safety of the device). It is also noted that the v-shaped projection 44 is constrained to move inside the channel 70, but is not constrained by the slot 74

With reference to FIG. 10 turning the handle 46 in the direction B away from the body of the descender causes the post 72 to move along the slot in the direction C during the first 90° of movement and then moves it back in the opposite direction to its start position shown in FIG. 10. As the handle is turned, the projection 112 can move along the slot 100 in the direction of the arrow D.

In use, with reference to FIGS. 5 and 10, when the rope 14 is passing through the descender and is under tension, for example because a person is using the descender to abseil down the rope, the forces on the rope cause the sheave to pivot against the biasing means and turn the sheave in the direction A which tends to slow the passage of the rope through the descender. As the sheave turns, the v-shaped projection 44 moves from the position 44a (rest) towards 44b where it engages with the projection 74. Therefore movement of the post in the direction C causes movement of the v-shaped projection 44 in that same direction C, which in turn causes the sheave to pivot in the opposite direction to the arrow A, reducing the friction of the rope and allowing it to pass more freely through the descender.

If the handle is moved too far in the direction B the projection 74 moves back in the opposite direction to arrow C and the sheave pivots back towards its rest position in the opposite direction to the arrow A, thus slowing down the passage of rope.

The projection 112 is able to move along the slot 100. With reference to FIGS. 11 and 12 in particular due to the geometry of the connection and the arcuate slots 100 and 74, after the handle has been turned through more than a particular angle (approximately 45° as shown but the exact angle is not critical) the, the projection 112 will move rapidly along the slot 100 in the direction of the arrow D to the distal end 100B of the slot 100. Depending on the geometry of the slots and the connector, this will occur when the when the projection 112 is about in the centre of the slot 100 as shown in FIG. 12. This will "lock" the apparatus in the braking position as a small movement of the handle will no longer release the braking and the handle will have to be turned to the rest position adjacent the body of the descender shown in FIG. 10 before the pin is able to travel towards the first end 100A of the slot.

A further safety feature arising from the geometry of the connector projections and slots is that the geometry is arranged so that the position in which the descender is providing the minimum resistance, in particular, is unstable so that if the handle is released it will not remain in that position and will move thus activating the braking.

Thus the operation of the handle is fail safe in the sense that at either extreme position maximum friction is applied to the rope so the fall of a user who falls unconscious and releases the handle will be braked while a user who might panic and push the lever too far would also have their fall braked.

The post provided at the exit of the descender provides an additional element that can be used to further increase resistance and slow the movement of the rope through the descender.

The use of fixed front and rear plates and a pivoting arm which can be pivoted from between the plates for loading rope into the descender makes the descender inherently safer than versions where the front or rear plates pivot to load rope into the descender.

Figure 13:
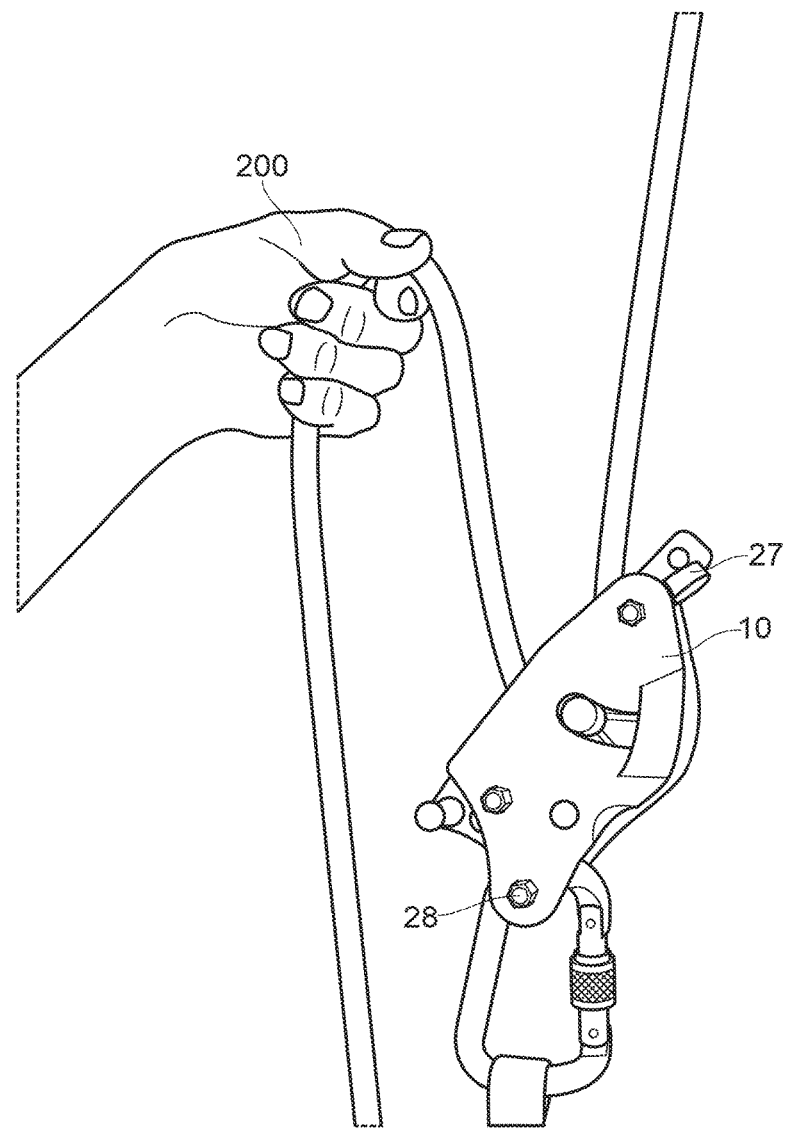
FIG. 13 illustrates the descender in use with a load attached to the descender using a karabiner.

FIG. 13 illustrates the descender in use with a load attached to the descender by a karabiner attached to the post 28 or "anchor point A". A hand 200 is shown holding the unloaded side of the rope. The rope slides through the descender to allow slack to be taken up. Pulling on the rope can be used to haul the load upwards. When hauling, pulleys can be used to create a mechanical advantage.

Figure 14:
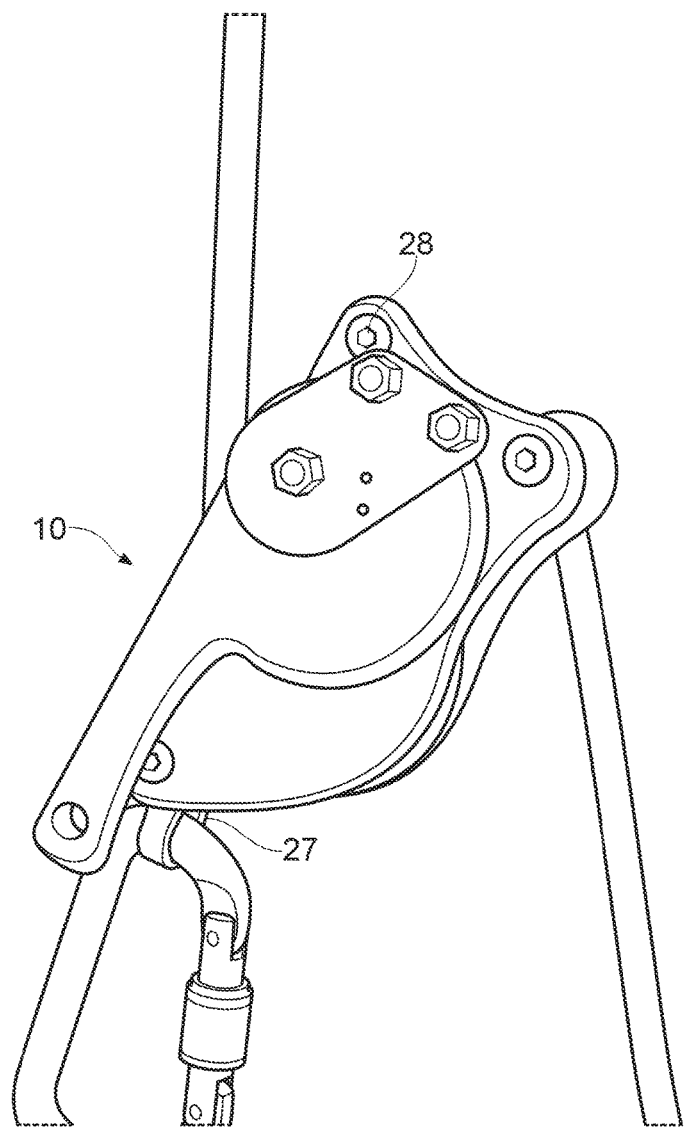
FIG. 14 shows the descender in use in the opposite orientation to FIG. 12.

FIG. 14 shows the descender in use in the opposite orientation to FIG. 13. In this case the karabiner is attached to the opposite end of the descender on loop 27 or "anchor point B"

The descender is able to be used in either orientation for various different rigging purposes. Pulleys or pulley kits can be attached to the upper most anchor point for use in assisting in pulling up the load. If the pulley system is released, the descender will stop the load from falling.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A descender comprising:
   a rear plate;
   a front plate which is fixedly mounted to the rear plate, generally parallel to and spaced from the rear plate;
   an arm which is pivotally mounted to the rear plate and/or the front plate, wherein the arm defines a generally curved channel through which a rope may pass, the channel being defined between a sheave and a wall of the arm and defining an entrance and an exit for the rope, and wherein the arm may be pivoted between an open position in which the arm is pivoted away from the front and rear plates to expose the sheave and the wall of the arm and a closed position in which the arm and sheave are located between the rear plate and front plate and wherein the sheave is pivotable about an axis, the sheave being biased towards a first or rest position, and wherein pivoting of the sheave about the axis in a first direction, away from the rest position, causes an increase in friction applied to the rope passing through the channel, by causing the exit of the channel to narrow; and wherein a handle is provided, operation of which may cause the sheave to rotate towards its rest or neutral position thereby allowing faster passage of the rope through the descender;

wherein the descender includes means for connecting the descender to a harness;

wherein the arm defines a base plate on which the sheave is mounted and the sheave defines an integral projection on its underside which passes through a first slot in the base plate of the arm and which in use engages with a first projection associated with and moveable by operation of the handle, thus allowing the handle to rotate the sheave;

wherein the rear plate defines an arcuate channel which is open at one end and in which a second slot is defined and in which the first projection is located and constrained to move; and wherein the first projection is defined on one end of a connecting rod and the opposite end of the connecting rod defines a second projection which locates in and is constrained by a third slot in the handle.

2. A descender as claimed in claim 1 wherein the first slot is arcuate.

3. A descender as claimed in claim 2 wherein the second slot is arcuate.

4. A descender as claimed in claim 3 wherein the first slot is arcuate.

5. A descender as claimed in claim 1 wherein a projection is mounted on the rear plate adjacent the exit to the channel.

6. A descender as claimed in claim 1 wherein the means for connecting the descender to a harness is a hole for receiving a karabiner.

7. A descender as claimed in claim 1 wherein the handle is able to pivot through a predetermined angle from one end position to a second end position and wherein in each end position the sheave is either unaffected by the handle or turned towards a position where the rope is subject to increased friction, and wherein movement of the handle to a position intermediate the end positions causes the sheave to move towards its rest position.

8. A descender as claimed in claim 1 wherein the sheave defines a bulge or projection which when the sheave is rotated under load, restricts the exit of the channel.

9. A descender as claimed in claim 1 wherein, in operation, after the handle has been turned through more than a predetermined angle, the second projection will move to one end of the third slot and maintain the sheave in a position in which a maximum braking force is applied to the rope until the handle is turned to a start position to re-set the descender.

10. A descender as claimed in claim 1 wherein the connecting rod, projections, and slots are shaped and configured such that when the handle is in a first position such that the descender is providing a minimum resistance, the first position of the handle is unstable so that if the handle is released it will not remain in the first position and will move, thus increasing or activating braking.

11. A descender comprising:

a rear plate;

a front plate which is fixedly mounted to the rear plate, generally parallel to and spaced from the rear plate;

an arm which is pivotally mounted to the rear plate and/or the front plate, wherein the arm defines a generally curved channel through which a rope may pass, the channel being defined between a sheave and a wall of the arm and defining an entrance and an exit for the rope, and wherein the arm may be pivoted to a closed position in which the arm and sheave are located between the rear plate and front plate and an open position in which the arm is pivoted away from the front and rear plates to expose the sheave and the wall of the arm, and wherein the sheave is pivotable about an axis, the sheave being biased towards a first or rest position, and wherein pivoting of the sheave about the axis in a first direction, away from the rest position, causes an increase in the friction applied to the rope passing through the channel;

wherein a handle is provided, operation of which may cause the sheave to rotate towards its rest or neutral position thereby allowing faster passage of the rope through the descender; and wherein the descender includes means for connecting the descender to a harness;

wherein the arm defines a base plate on which the sheave is mounted and the sheave defines an integral projection on its underside which passes through a first arcuate slot in the base plate of the arm and which in use engages with a first projection associated with and moveable by operation of the handle, thus allowing the handle to rotate the sheave;

wherein the rear plate defines an arcuate channel which is open at one end and in which a second slot is defined and in which the first projection is located; and wherein the first projection is defined on one end of a connecting rod and the opposite end of the connecting rod defines a second projection which locates in a third slot in the handle.

12. A descender as claimed in claim 11 wherein, in operation, after the handle has been turned through more than a predetermined angle, the second projection moves to one end of the third slot and maintains the sheave in a position in which a maximum braking force is applied to the rope until the handle is turned to a start position to re-set the descender.

13. A descender as claimed in claim 12 wherein the connecting rod, projections, and slots are shaped and configured such that when the handle is in a first position such that the descender is providing a minimum resistance, the first position of the handle is unstable so that if the handle is released it will not remain in the first position and will move, thus increasing or activating braking.

* * * * *